(12) United States Patent
Maleport

(10) Patent No.: US 9,608,893 B2
(45) Date of Patent: Mar. 28, 2017

(54) METHODS AND SYSTEMS FOR PARSING DATA OBJECTS

(75) Inventor: Joel John Maleport, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 269 days.

(21) Appl. No.: 13/406,050

(22) Filed: Feb. 27, 2012

(65) Prior Publication Data
US 2013/0227519 A1 Aug. 29, 2013

(51) Int. Cl.
| | |
|---|---|
| *G06F 9/44* | (2006.01) |
| *H04L 12/26* | (2006.01) |
| *H04L 29/08* | (2006.01) |
| *H04L 29/06* | (2006.01) |
| *G06F 9/445* | (2006.01) |

(52) U.S. Cl.
CPC ............ *H04L 43/12* (2013.01); *H04L 43/18* (2013.01); *H04L 67/34* (2013.01); *H04L 69/03* (2013.01); *G06F 8/30* (2013.01); *G06F 9/44526* (2013.01)

(58) Field of Classification Search
CPC .......... G06F 9/44; G06F 9/44526; G06F 8/30; H04L 67/34; H04L 43/12; H04L 43/18; H04L 69/03; G04L 67/34
USPC .................................................. 717/106, 171
See application file for complete search history.

(56) References Cited

U.S. PATENT DOCUMENTS

| | | | | |
|---|---|---|---|---|
| 2004/0083299 A1* | 4/2004 | Dietz | ............... | G06F 17/30985 709/230 |
| 2004/0226008 A1 | 11/2004 | Jacobi et al. | | |
| 2004/0250257 A1* | 12/2004 | Koutyrine | ................ | G06F 8/10 719/315 |
| 2007/0168534 A1* | 7/2007 | Hiltunen | .............. | H04N 21/235 709/230 |
| 2007/0260740 A1* | 11/2007 | Guan | .................. | G06F 9/45516 709/230 |

OTHER PUBLICATIONS

Combined Search and Examination Report for Application No. GB1303511.8 dated Sep. 23, 2013, 6 pages.*

(Continued)

*Primary Examiner* — Qing Chen
*Assistant Examiner* — Mohammed Huda
(74) *Attorney, Agent, or Firm* — Armstrong Teasdale LLP

(57) ABSTRACT

Methods and apparatuses for use in applying an update to a communication protocol in a software application that is executed by a computing device are described herein. The computing device receives a protocol definition corresponding to a communication protocol and indicating positions of data elements within data objects corresponding to the communication protocol. When the computing device determines that the received protocol definition differs from a previous protocol definition corresponding to the communication protocol, the computing device creates a machine-executable object parser based on the received protocol definition. The machine-executable object parser is accessible to a software application executed by the computing device. The software application receives a data object corresponding to the communication protocol, and the computing device executes the machine-executable object parser to parse at least a portion of the data elements in the data object received by the software application.

20 Claims, 11 Drawing Sheets

(56) References Cited

OTHER PUBLICATIONS

Redsim; http://redsim.com/products/monitor.htm; Copyright © 2001-2010; pp. 6.
Ulf Lamping, et al., Wireshark Users Guide for Wireshark 1.7; Copyright © 2004-2011; pp. 249.
UK Examination Report for related application GB1303511.8 dated Nov. 16, 2015; 2 pp.
UK Examination Report for related application GB1303511.8 dated Aug. 2, 2016, 2 pp.

* cited by examiner

METHODS AND SYSTEMS FOR PARSING DATA OBJECTS

BACKGROUND

The field of the disclosure relates generally to parsing data objects and, more specifically, to automatic generation and execution of machine-executable object parsers based on protocol definitions.

At least some known network protocol analysis tools allow a user to define protocols in a file (e.g., text, XML, or binary) or in a database. A message corresponding to a protocol may be parsed by interpreting the contents of the protocol definition file/database. For example, the protocol definition may define the offsets and sizes (in bytes) of fields in the data that make up a network protocol message. Each time a message is to be processed (e.g., displayed), the message and the protocol definition are parsed, offsets are computed, and data are extracted.

Another practice is to compile protocol parsing source code into pre-compiled plug-ins, which eliminate the step of parsing the protocol definition each time a message is received but may be too inflexible for some uses. For example, an end user may be unable to add a custom message or make any other change to the protocol definition. Rather, to accommodate the desired change, a software developer must create a new protocol parsing plug-in by modifying the protocol parsing source code and compiling the modified source code into a plug-in, and distributing the plug-in to the end user.

BRIEF DESCRIPTION

In one aspect, a method for applying an update to a communication protocol in a software application executed by a computing device is provided. The method includes receiving, by the computing device, a protocol definition that corresponds to a communication protocol and indicates positions of data elements within data objects corresponding to the communication protocol. The computing device determines that the received protocol definition differs from a previous protocol definition corresponding to the communication protocol and, based on the determined difference between the received protocol definition and the previous protocol definition, creates a machine-executable object parser based on the received protocol definition. The machine-executable object parser is accessible to a software application executed by the computing device. The software application receives a data object corresponding to the communication protocol, and the computing device executes the machine-executable object parser to parse at least a portion of the data elements in the data object received by the software application.

In another aspect, a system for applying an update to a communication protocol in a software application is provided. The system includes a memory for storing a first protocol definition corresponding to a communication protocol, and a communications unit configured to receive a second protocol definition corresponding to the communication protocol. The second protocol definition indicates positions of data elements within data objects corresponding to the communication protocol. The system further includes a processor unit that is coupled to the memory and the communication interface. The processor is programmed to determine that the second protocol definition differs from the first protocol definition and, based on the determined difference between the received protocol definition and the previous protocol definition, create a machine-executable object parser based on the second protocol definition. The machine-executable object parser is accessible to a software application executed by the processor unit. The processor is also programmed to receive by the software application a data object corresponding to the communication protocol, and to execute the machine-executable object parser to parse at least a portion of the data elements in the data object received by the software application.

In yet another aspect, a storage device having computer-executable instructions embodied thereon is provided. When executed by a processor unit, the computer-executable instructions cause the processor unit to receive, by the processor unit, a protocol definition corresponding to a communication protocol. The received protocol definition indicates positions of data elements within data objects corresponding to the communication protocol. The computer-executable instructions also cause the processor unit to determine, by the processor unit, that the received protocol definition differs from a previous protocol definition corresponding to the communication protocol, and based on the determined difference between the received protocol definition and the previous protocol definition, to create, by the processor unit, a machine-executable object parser based on the received protocol definition. The machine-executable object parser is accessible to a software application executed by the processor unit. The computer-executable instructions also cause the processor unit to receive, by the software application, a data object corresponding to the communication protocol, and to execute, by the computing device, the machine-executable object parser to parse at least a portion of the data elements in the data object received by the software application.

The features, functions, and advantages that have been discussed can be achieved independently in various embodiments or may be combined in yet other embodiments further details of which can be seen with reference to the following description and drawings.

DETAILED DESCRIPTION

Methods and systems described herein enable communication protocol updates to be applied to a software application without requiring updates to the software application itself, and without requiring a software developer to write custom source code. Instead, a computing device may automatically create an object parser based on a protocol definition corresponding to a communication protocol, and this object parser may be used to parse data elements within data objects corresponding to the communication protocol. Further, when the protocol definition is modified, a new version of the object parser may be automatically created, providing support for the new protocol definition to the software application.

Figure 1:
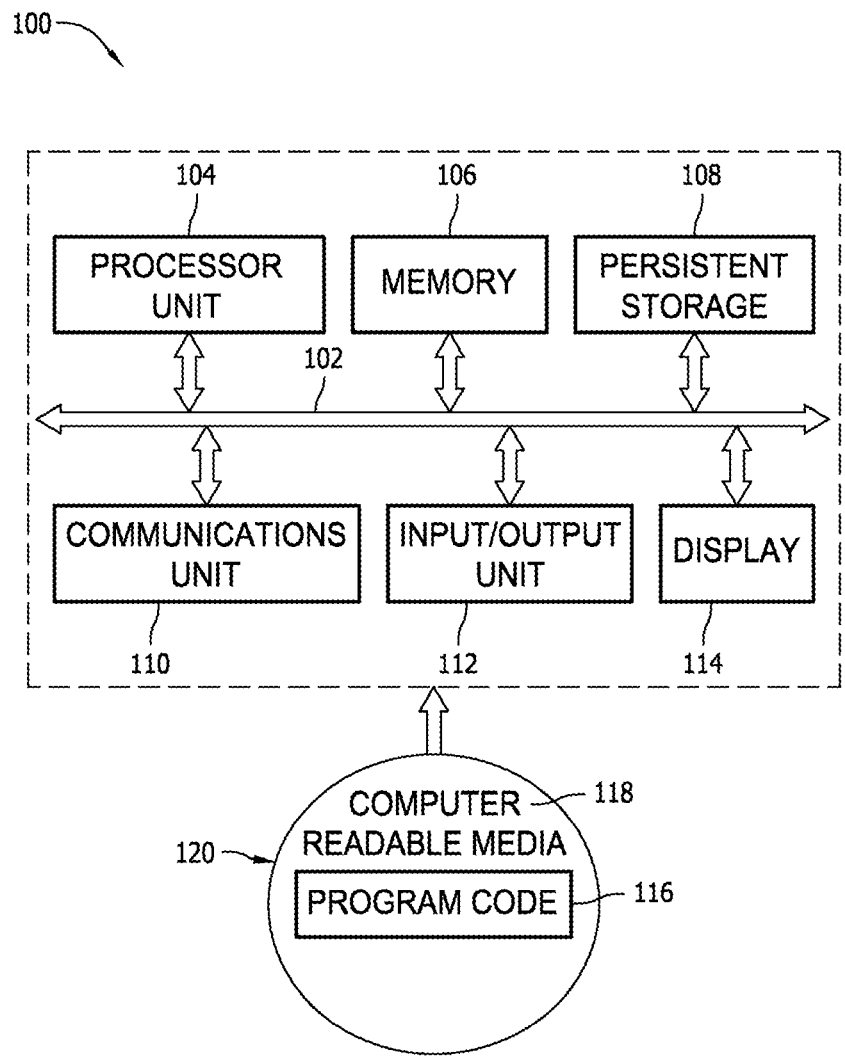
FIG. 1 is a block diagram of an exemplary computing device.

Exemplary embodiments are implemented using computing devices. FIG. 1 is a block diagram of an exemplary computing device 100. In the exemplary embodiment, computing device 100 includes communications fabric 102 that provides communications between a processor unit 104, a memory 106, persistent storage 108, a communications unit 110, an input/output (I/O) unit 112, and a presentation interface, such as a display 114. In addition, or in the alternative, the presentation interface may include an audio device (not shown) and/or any device capable of conveying information to a user.

Processor unit 104 executes instructions for software that may be loaded into a storage device (e.g., memory 106). Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any tangible piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store (e.g., have embodied thereon) source code, computer-executable instructions, software applications, protocol definitions, machine-executable object parsers, and/or any other information suitable for use with the methods described herein. When executed by a processor (e.g., processor unit 104), computer-executable instructions and/or components cause the processor to perform one or more of the operations described herein.

Communications unit 110, in these examples, provides for communications with other computing devices or systems. In the exemplary embodiment, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information, such as any information described herein, to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer-readable media, such as memory 106 or persistent storage 108.

Program code 116 is located in a functional form on non-transitory computer-readable media 118 that is selectively removable and may be loaded onto or transferred to computing device 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to computing device 100. The tangible form of computer-readable media 118 is also referred to as computer recordable storage media. In some instances, computer-readable media 118 may not be removable.

Alternatively, program code 116 may be transferred to computing device 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer-readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include one or more part agents, ordering manager agents, supplier agents, and/or any component suitable for practicing the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer-readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
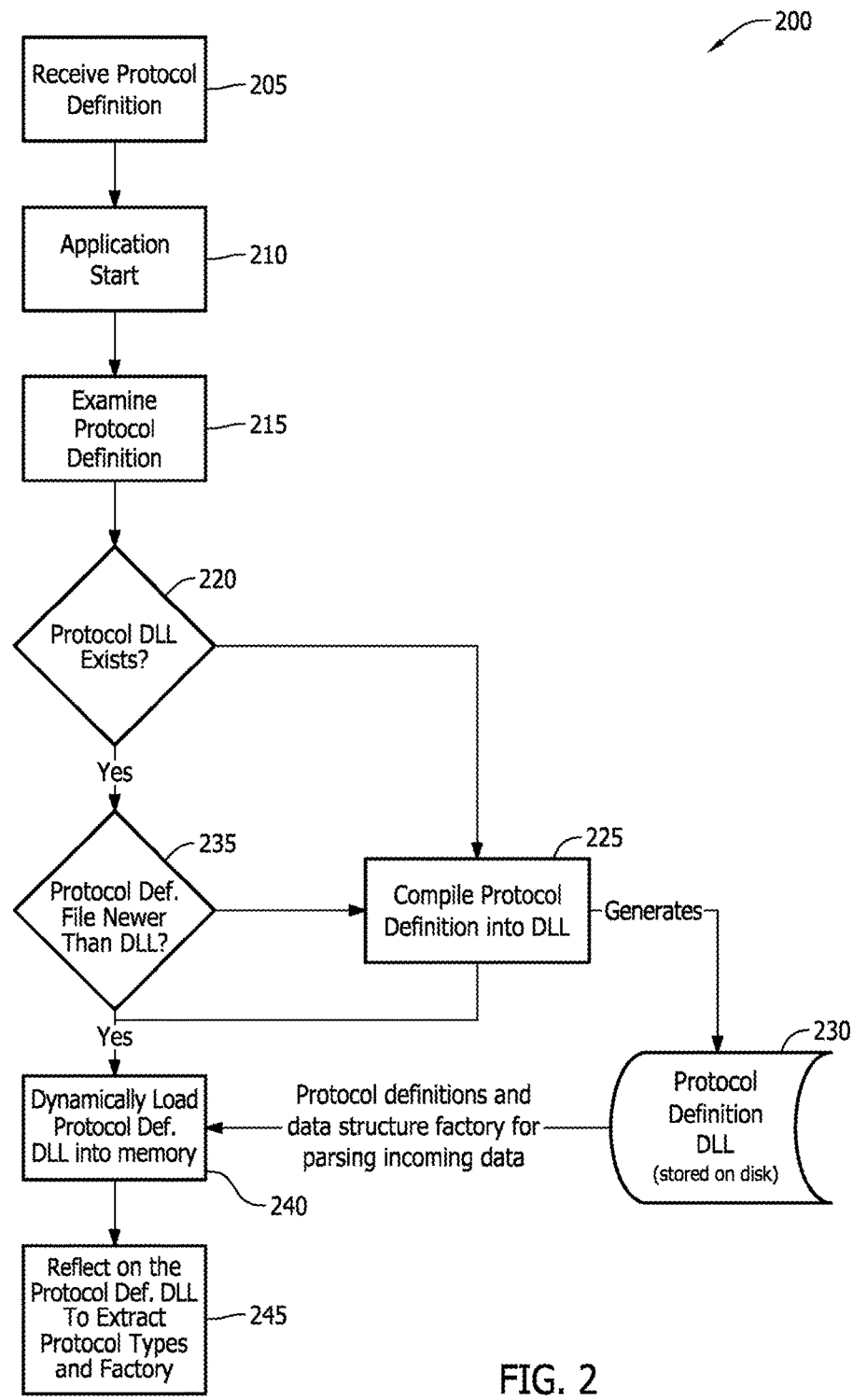
FIG. 2 is a flowchart illustrating an exemplary method for applying an update to a communication protocol in a software application executed by a computing device.

FIG. 2 is a flowchart illustrating an exemplary method 200 for applying an update to a communication protocol in a software application executed by a computing device (e.g., computing device 100, shown in FIG. 1). Referring to FIGS. 1 and 2, in exemplary embodiments, computing device 100 receives 205 a protocol definition corresponding to a communication protocol. For example, the protocol definition may be received 205 from another computing device 100 by communications unit 110, received from a user by input/output unit 112, copied (e.g., by a user) to memory device 106 and/or persistent storage 108, and/or received on computer-readable media 118. The received protocol definition indicates positions of data elements within data objects corresponding to the communication protocol.

Computing device 100 starts 210 a software application, such as by executing computer-executable instructions associated with the software application. For example, the software application may include a network analysis tool that parses and displays data objects transmitted over a network to which computing device 100 is connected (e.g., via communications unit 110).

Computing device 100 examines 215 the received protocol definition. In exemplary embodiments, examining 215 the protocol definition may include validating the protocol definition to ensure that the protocol definition is well-formed, complete, and/or parseable. If the validation fails, an error may be reported. Otherwise, method 200 continues as described below. In other exemplary embodiments, examining 215 the protocol definition may also include determining that the received protocol definition corresponds to a protocol definition format and parsing the received protocol definition based on the protocol definition format.

Computing device 100 determines 220 whether a machine-executable object parser corresponding to the communication protocol exists. For example, computing device 100 may determine 220 whether an executable library, such as a dynamic link library (DLL) or a dynamic shared object (DSO), corresponding to the communication protocol exists. If no such machine-executable object parser exists, computing device 100 creates (e.g., compiles) 225 a machine-executable object parser 230 based on the received protocol definition, as described in more detail below with reference to FIG. 3. Machine-executable object parser 230 is accessible to one or more software applications executed by computing device 100. For example, machine-executable object parser 230 may include one or more functions that a software application can invoke to parse a data object corresponding to the communication protocol.

If a machine-executable object parser corresponding to the communication protocol already exists (e.g., stored in memory 106 and/or persistent storage 108), computing device 100 determines 235 whether the received protocol definition differs from (e.g., is newer than) the existing machine-executable object parser and/or newer than the protocol definition that corresponds to the existing machine-executable object parser. In some embodiments, computing device 100 determines 235 whether the received protocol definition is newer based on a write timestamp. For example, computing device 100 may determine 235 that the received protocol definition is newer when the write timestamp associated with the received protocol definition is newer than the write timestamp associated with the existing machine-executable object parser and/or the protocol definition that corresponds to the existing machine-executable object parser. In other embodiments, computing device determines 235 that the received protocol definition is newer when the content of the received protocol definition differs from the content of the previous protocol definition.

If the received protocol definition is newer, the existing machine-executable object parser and the protocol definition corresponding thereto are considered a previous and/or superseded machine-executable object parser and protocol definition, respectively, and computing device 100 creates (e.g., compiles) 225 a machine-executable object parser 230 based on the received protocol definition.

Computing device 100 dynamically loads 240 machine-executable object parser 230 into memory (e.g., memory 106) and analyzes, or "reflects on", 245 machine-executable object parser 230 to extract data structures and functions (e.g., protocol types and data structure factories) included in machine-executable object parser 230. In exemplary embodiments, machine-executable object parser 230 is created 225 in the form of a dynamic linked library (DLL) and is loaded 240 dynamically through the use of a standard operating system call, such as Assembly.LoadFrom in the Microsoft Windows operating system. This is in contrast to DLLs that are loaded statically at application startup. Statically loaded DLLs are DLLs that were known at the time of the original compilation of the network analysis application compilation. Dynamically loaded DLLs are DLLs that the application (and therefore its developers) has no prior knowledge of prior to deployment. Accordingly, new machine-executable object parsers 230 may be created 225 and loaded 240 for use with a software application without requiring any change to, re-compilation of, or re-linking of the software application itself.

Notably, method 200 creates 225 machine-executable object parser 230 only when there is no existing machine-executable object parser 230, or the received protocol definition differs from the protocol definition corresponding to the existing machine-executable object parser 230. The created machine-executable object parser 230 is thus stored and executed by the computing device 100 in the manner more fully described herein with reference to FIG. 4 until an updated protocol definition different from that stored on the computing device 100 is received 205 by the computing device 100. Method 200 therefore avoids unnecessary processing (e.g., re-compiling the same machine-executable object parser 230), potentially decreasing the amount of time required to execute the software application.

In one exemplary embodiment, some or all of Steps 215-245 are repeated each time the application is started 210 to determine whether there is no existing machine-executable object parser 230, or the received protocol definition differs from the protocol definition corresponding to the existing machine-executable object parser 230.

Figure 3:
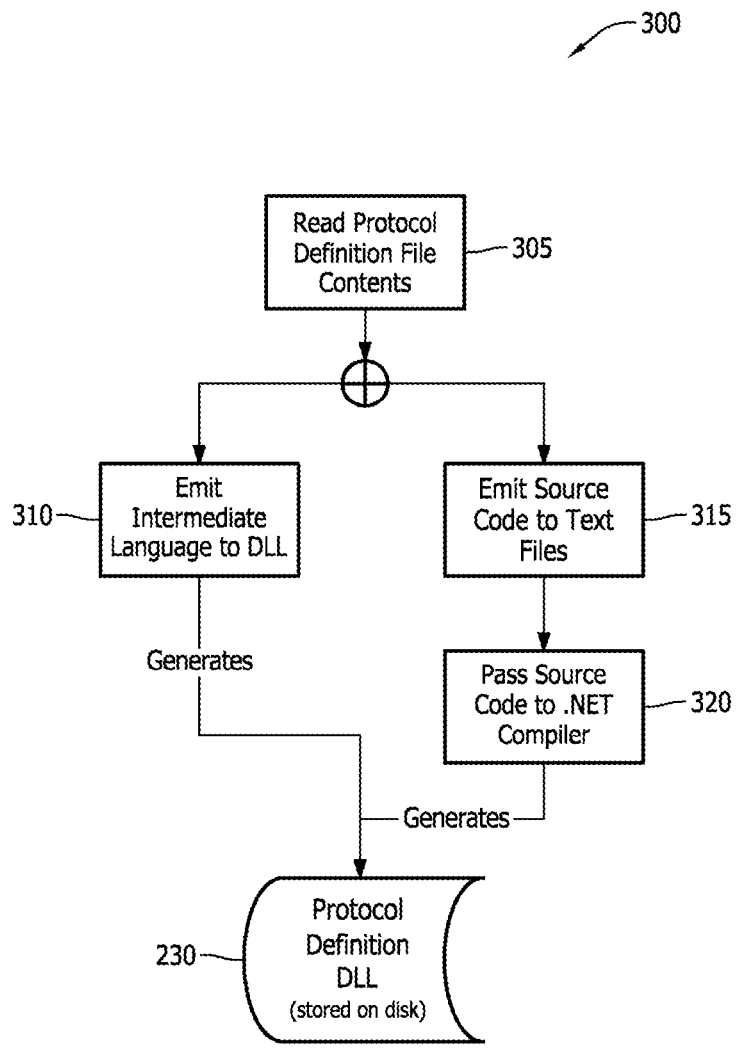
FIG. 3 is a flowchart illustrating an exemplary method for creating a machine-executable object parser.

FIG. 3 is a flowchart illustrating an exemplary method 300 for creating 225 (shown in FIG. 2) a machine-executable object parser 230. In exemplary embodiments, computing device 100 reads 305 the content of the protocol definition from a file or a database in a storage device (e.g., persistent storage 108). For example, the content of the protocol definition may include offsets and/or sizes (e.g., in bytes) of fields, field delimiters, message and/or record delimiters, data tags, and/or any other information that may be used to parse a data object contained within a message transmitted over a network. In some embodiments, computing device 100 reads 305 the content of a protocol definition encoded as one or more XML files that define a protocol structure. An example of an XML protocol definition is provided in Listing 1 below.

Listing 1

```
<Classes>
  <Options namespace="Organization.Ontology.DIS"
outputdir="Common" indention="3" />
  <Using namespace="Organization.Ontology.DIS.Enumerations" />
  <Class name="Coordinate3F">
    <Field type="float" name="X" comment="Velocity about the x axis" />
    <Field type="float" name="Y" comment="Velocity about the y axis" />
    <Field type="float" name="Z" comment="Velocity about the z axis" />
  </Class>
  <Class name="AntennaLocation">
    <Field type="Coordinate3D" name="Location"/>
    <Field type="Coordinate3F" name="RelativeLocation"/>
  </Class>
</Classes>
```

Machine-executable object parser 230 may be created in a variety of manners. In some embodiments, computing device 100 converts 310 the protocol definition directly to an intermediate language, such as the Microsoft Intermediate Language, which is common to the .NET development platform. This may be accomplished using the .NET Emit application programming interface (API) (see http://msdn-.microsoft.com/en-us/library/3y322t50.aspx). Converting 310 the protocol definition into an intermediate language may allow the created code to be optimized because the most efficient intermediate language instructions can be selected during conversion 310. The intermediate language is written to the compiled protocol definition DLL just as if compiled using a standard software development environment like the Microsoft Visual Studio compiler.

Another option for creating the compiled protocol definition DLL is to first generate 315 human-readable source code based on the protocol definition in a language such as C#, and then provide 320 the generated source code to a compiler (e.g., the .NET compiler) at runtime (e.g., during execution of method 200, shown in FIG. 2). An example of source code that computing device 100 may generate 315 based on the protocol definition in Listing 1 is shown in Listing 2 below.

Listing 2

```
using System;
using System.ComponentModel;
using System.Collections.Generic;
using System.IO;
using System.Text;
using System.Xml.Serialization;
```

Listing 2
-continued

```
using Organization.Ontology.DIS.Enumerations;
namespace Organization.Ontology.DIS
{
/// <summary>
/// Section 5.2.33. Three floating point values, x, y, and z
/// </summary>
[Serializable]
[TypeConverter(typeof(ExpandableObjectConverter))]
public partial class Coordinate3F : PduPart
{
  #region ///////////////////// INITIALIZATION /////////////////////
  ////////////////////////////////////////////////////////////////////
  /// <summary>
  /// Instantiates and intializes a <see cref="T:Coordinate3F"/> object.
  /// </summary>
  public Coordinate3F( )
  {
    InitCoordinate3F( );
  }
  ////////////////////////////////////////////////////////////////////
  /// <summary>
  /// Creates a new <see cref="T:Coordinate3F"/> and initializes the
  /// object using the object provided.
  /// </summary>
  ///
  /// <param name="copyFrom">
  /// The object to copy initial values from.
  /// </param>
  public Coordinate3F(Coordinate3F copyFrom) : base(copyFrom)
  {
    Copy(copyFrom);
  }
  ////////////////////////////////////////////////////////////////////
  /// <summary>
  /// Initializes class properties.
  /// </summary>
  protected virtual void InitCoordinate3F( )
  {
  }
  #endregion // Initialization
  #region ///////////////////// PROPERTIES /////////////////////
  /// <summary>
  /// X value
  /// </summary>
  [XmlAttribute("x")]
  [DisplayName("X")]
  [Description("X value")]
  [Category("Coordinate3F")]
  public virtual float X { get; set; }
  /// <summary>
  /// Y value
  /// </summary>
  [XmlAttribute("y")]
  [DisplayName("Y")]
  [Description("Y value")]
  [Category("Coordinate3F")]
  public virtual float Y { get; set; }
  /// <summary>
  /// Z value
  /// </summary>
  [XmlAttribute("z")]
  [DisplayName("Z")]
  [Description("Z value")]
  [Category("Coordinate3F")]
  public virtual float Z { get; set; }
  #endregion // Properties
  #region ///////////////////// SERIALIZATION /////////////////////
  ////////////////////////////////////////////////////////////////////
  /// <summary>
  /// Serializes the PDU to its binary form using the given PduWriter.
  /// </summary>
  ///
  /// <param name="writer">
  /// The PduWriter instance to serialize the binary PDU to.
  /// </param>
  public virtual void Serialize(PduWriter writer)
  {
```

Listing 2

```
    if (writer != null)
    {
      writer.Write(X);
      writer.Write(Y);
      writer.Write(Z);
    }
    else
    {
      throw new ArgumentNullException
            ("writer",
            "PDU serialization failed because the writer input
parameter is null.");
    }
  }
  ///////////////////////////////////////////////////////////////
  /// <summary>
  /// Deserializes the binary PDU from the given PduReader.
  /// </summary>
  ///
  /// <param name="reader">
  /// The PduReader instance to deserialize the binary PDU from.
  /// </param>
  public virtual void Deserialize(PduReader reader)
  {
    if (reader != null)
    {
      X = reader.ReadSingle( );
      Y = reader.ReadSingle( );
      Z = reader.ReadSingle( );
    }
    else
    {
      throw new ArgumentNullException
            ("reader",
            "PDU deserialization failed because the reader input
parameter is null.");
    }
  }
  #endregion // Serialization
  #region ///////////////////// PUBLIC METHODS /////////////////////
  ///////////////////////////////////////////////////////////////
  /// <summary>
  /// Creates a new object that is a copy of the current instance.
  /// </summary>
  ///
  /// <returns>
  /// The new object which is a clone of this object.
  /// </returns>
  public override object Clone( )
  {
    return new Coordinate3F(this);
  }
  ///////////////////////////////////////////////////////////////
  /// <summary>
  /// Returns a <see cref="System.String"/> that represents this object
  /// instance.
  /// </summary>
  ///
  /// <returns>
  /// A <see cref="System.String"/> that represents this instance.
  /// </returns>
  public override string ToString( )
  {
    return string.Format("X: {0} Y: {1} Z: {2}", X, Y, Z);
  }
  #endregion // Public Methods
  #region ///////////////////// PRIVATE METHODS /////////////////////
  ///////////////////////////////////////////////////////////////
  /// <summary>
  /// Creates a new <see cref="T:Coordinate3F"/> and initializes the
  /// object using the object provided.
  /// </summary>
  ///
  /// <param name="copyFrom">
  /// The object to copy initial values from.
  /// </param>
  private void Copy(Coordinate3F copyFrom)
  {
    this.X = copyFrom.X;
    this.Y = copyFrom.Y;
    this.Z = copyFrom.Z;
  }
  #endregion // Private Methods
}
```

In exemplary embodiments, generated source code may be provided 320 for compilation using the .NET CSharp-CodeProvider (see http://msdn.microsoft.com/en-us/library/microsoft.csharp.csharpcodeprovider.aspx).

Notably, the machine-executable object parser 230 may be created 225 by the computing device 100 without prompting a user of the computing device 100 to approve the creation of the machine-executable object parser.

Figure 4:
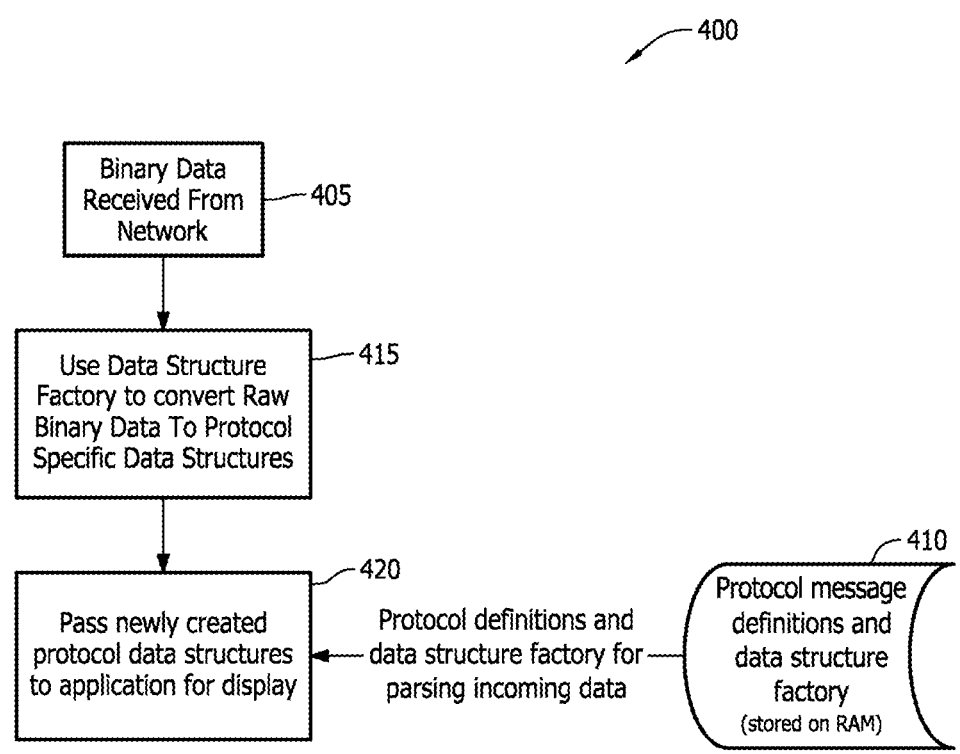
FIG. 4 is a flowchart illustrating an exemplary method for parsing and displaying data elements in a data object.

FIG. 4 is a flowchart illustrating an exemplary method 400 for parsing and displaying data elements in a data object. In exemplary embodiments, a software application executed (e.g., started 210, shown in FIG. 2) by computing device 100 receives 405 a data object corresponding to the communication protocol. The data object received 405 may be encoded in binary form (e.g., machine-readable but not human-readable).

Computing device 100 executes machine-executable object parser 230 (shown in FIG. 2) to parse at least a portion of the data elements in the received data object. In exemplary embodiments, machine-executable object parser 230 includes protocol message definitions and a data structure factory 410, which computing device 100 retrieves and executes, using 415 data structure factory 410 to convert the raw binary data being read in from the network into protocol specific data structures.

Data structure factory 410 includes machine-executable code that determines the type of data contained in the received binary data. In an exemplary embodiment, data structure factory 410 processes the Distributed Interactive Simulation (DIS) (IEEE 1278) protocol. In the DIS protocol, the third byte of each protocol message identifies what the protocol message is. In this example, the DIS data structure factory may implement a "switch" statement that would branch based on the protocol message type. For example, a value of '1' could represent an Entity State message, while a value of '2' could represent a Fire message, and so on. If the raw binary data contained a value of '1' in byte position 3, then the DIS data structure factory would locate the class or type in protocol definitions 410 that implements the Entity State DIS message, instantiate an Entity State data structure in memory, and then pass the raw binary data to the newly instantiated Entity State data structure for parsing and interpretation.

After the protocol specific data structure was instantiated and the raw binary data was processed in step 415, the resulting data structure would be passed 420 to the software application (e.g., a network protocol analysis application). For example, the software application may display the data structure to the user.

Using 415 data structure factory and protocol definitions 410 to create protocol specific data structures allows data received 405 from the network to be parsed quickly and efficiently at runtime without the aid of lookup tables. Instead of computing offsets into an array of data, the message data is converted to structured data in memory with all of the type safety that a modern computing language like C# offers.

Referring again to FIG. 2, the application reflects 245 on the protocol specific data structures created in Step 415 to determine the structure of the data or to retrieve discrete values from the data. This ability of the application to reflect relies on the underlying development environment to support reflection. Languages like C#, VB.NET, and Java all support reflection. Reflection involves emitting type information about classes and objects to the executable files (i.e. DLLs) and making that information available at runtime for the purpose of querying data structures, attributes, and capabilities.

In exemplary embodiments, when the protocol specific data structures created in Step 415 are passed 420 to the application for display, the application can reflect 245 on the data to determine the structure of the data or to retrieve discrete values from the data. For example, commercial off-the-shelf (COTS) component libraries commonly use reflection to retrieve data for display. Embodiments of these component libraries include DevExpress, Infragistics, and ComponentOne. When these COTS component libraries display data in grid or graph form, they commonly use reflection to retrieve the value of fields in a data structure. This is done to make the COTS components very flexible and allows these COTS components to work with data types which they know relatively nothing about. But by using reflection, these COTS components can query a data structure that resides in memory and determine what properties or fields can be displayed, whether the data is modifiable or not, whether the data is nested or not, the names and types of the data to be displayed, and conversion routines for displaying data in textual form.

By carefully constructing the emitted intermediate language in Step 310 or the source code in Step 315, type metadata can be applied to help these COTS tools display the information contained in the custom data structures generated by protocol message definitions and data structure factory 410.

This means that an essential step to the support of graphing, grouping, sorting, searching, and filtering the data is in the form the intermediate or source language takes on. Thus, the actual graphing, grouping, sorting, searching, and filtering is performed by the COTS components, but this capability would not be possible without structuring the protocol data structures for use with these COTS components.

Exemplary Implementation

FIGS. 5-11 are block diagrams illustrating exemplary implementations of a system for parsing data objects based on protocol definitions.

Figure 5:
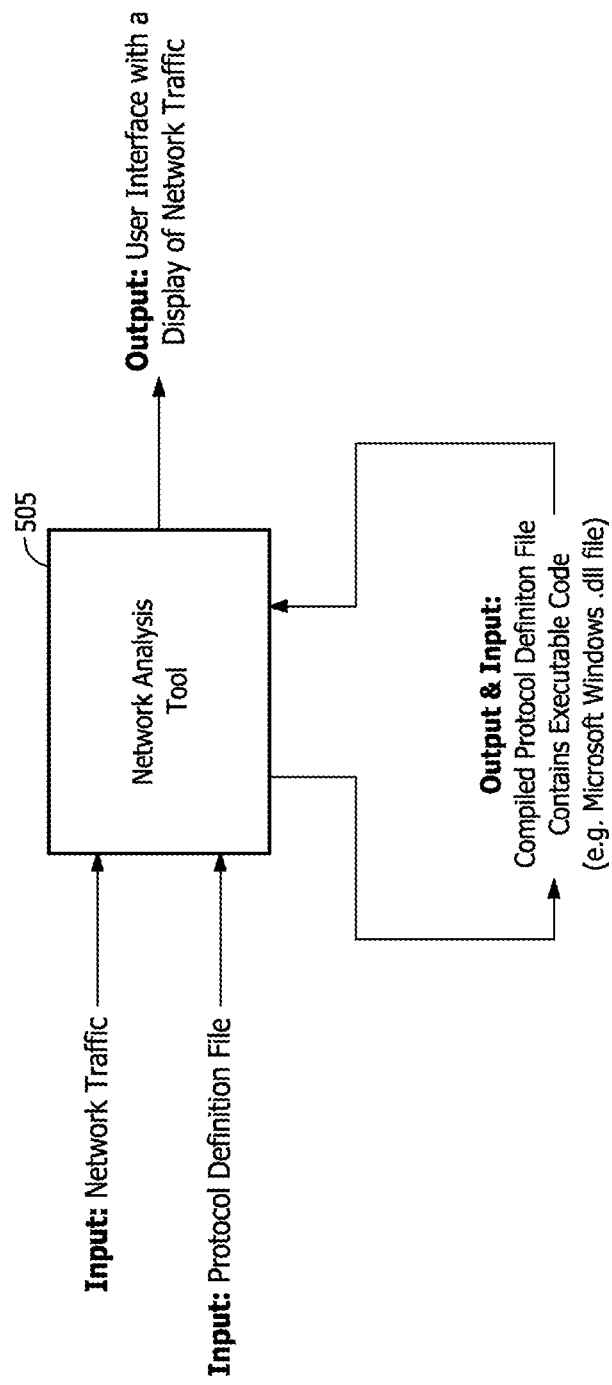
FIGS. 5-11 are block diagrams illustrating exemplary implementations of a system for parsing data objects based on protocol definitions.

FIG. 5 is a block diagram illustrating an exemplary implementation of a system 500 for parsing data objects based on protocol definitions. Network analysis tool 505 is an application capable of carrying out Steps 215-245 (FIG. 2) in the manner described more fully herein with reference to FIG. 2. System 500 generally provides an application responsible for monitoring network traffic, parsing the contents of the collected network traffic, and presenting it to the user for review and analysis. Additional modules presented in FIGS. 6-11 represent exemplary subsystems of the network analysis tool 505. Described further herein are exemplary subsystems of network analysis tool 505 responsible for parsing protocol definition files, generating parsing code dynamically at runtime, and processing incoming raw network traffic and converting it to a format that enables analysis and display.

Figure 6:
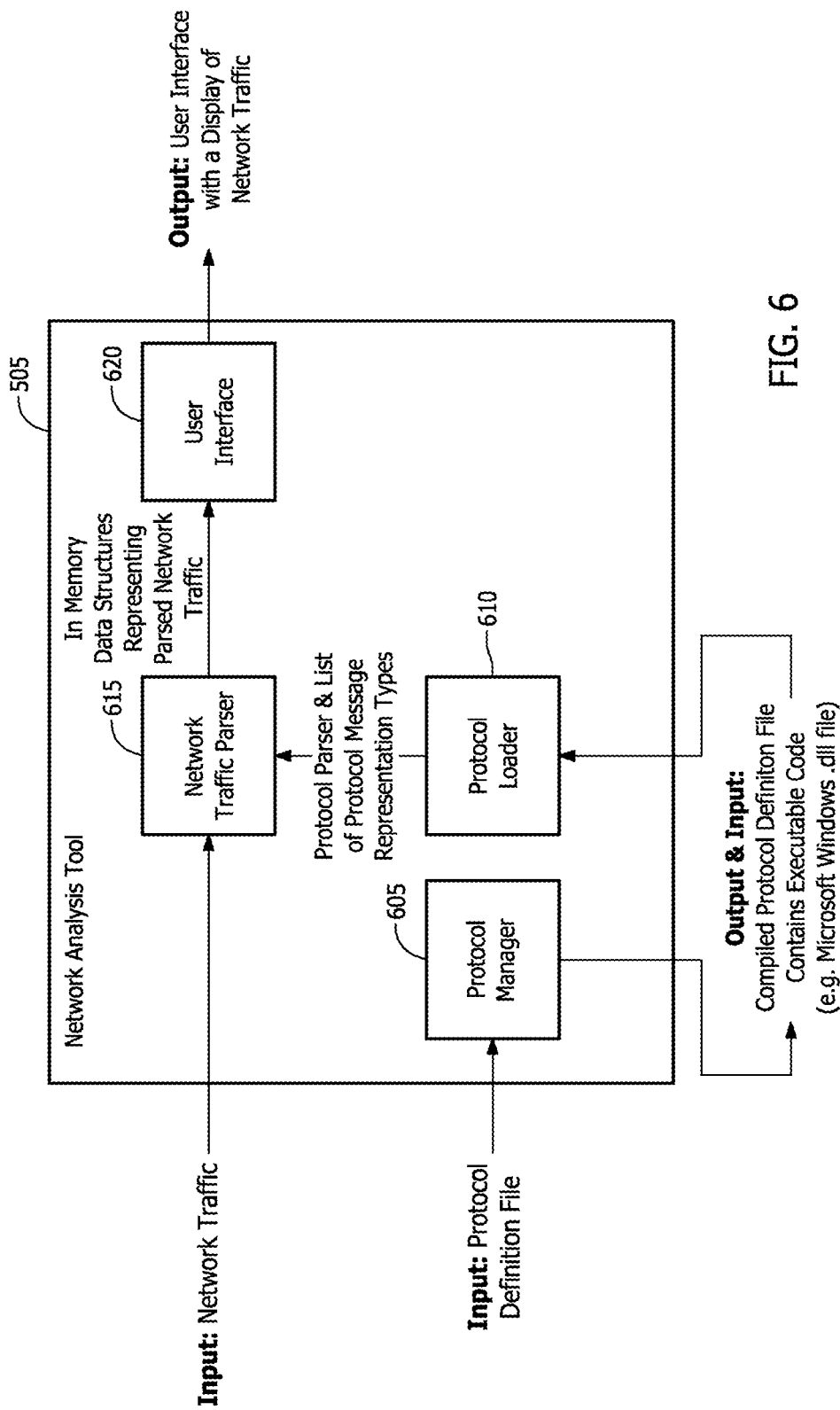

FIG. 6 is a block diagram illustrating an exemplary embodiment of the network analysis tool 505. In the exemplary embodiment, In this embodiment, network analysis tool 505 (FIG. 5) includes protocol manager 605, protocol loader 610, network traffic parser 615, and user interface 620. Protocol manager 605 is a subsystem of network analysis tool 505. Protocol manager 605 is responsible for converting the input protocol definition files into compiled protocol definition files. In one embodiment, protocol manager 605 run once at application startup to determine if any of the compiled protocol definition files needed to be rebuilt as a result of changes to the input protocol definition files.

In one embodiment, protocol loader 610 is responsible for loading data into memory and making executable code available to the network analysis tool 505 application. In this embodiment, protocol loader 610 employs a runtime linking methodology in which the module to be loaded is unknown at the time of the original compilation of the network analysis tool 505. This is accomplished by having the compiled protocol definition file built in conformance with a standard API that protocol loader 610 supports. Thus, a multitude of protocols that were completely unknown at the time of the original compilation of network analysis tool 505 can be defined and loaded into network analysis tool 505 via protocol loader 610.

In one embodiment, network traffic parser 615 is responsible for converting raw network traffic into protocol specific message types that break the raw data down into fundamental components (i.e., integers, floats, strings, flags, and enumerations). Network traffic parser 615 requests the parser from protocol loader 610 and uses the requested parser to convert the raw network traffic into in-memory protocol specific message types. All knowledge, rules, and instructions regarding how to convert the raw network data into an in-memory format is handled by the parser, which is ultimately defined in the compiled protocol definition file. Thus, network traffic parser 615 may simply pass the proper raw network traffic to the proper parser and collect the resulting in-memory protocol specific data structures. In one embodiment, user interface 620 takes the in-memory representation of the parsed network traffic and presents it to the user using standard rendering APIs provided by the operating system. In this embodiment, the in-memory representation of the parsed network traffic is handed off to either a display or analysis module for further processing of the parsed data.

Figure 7:
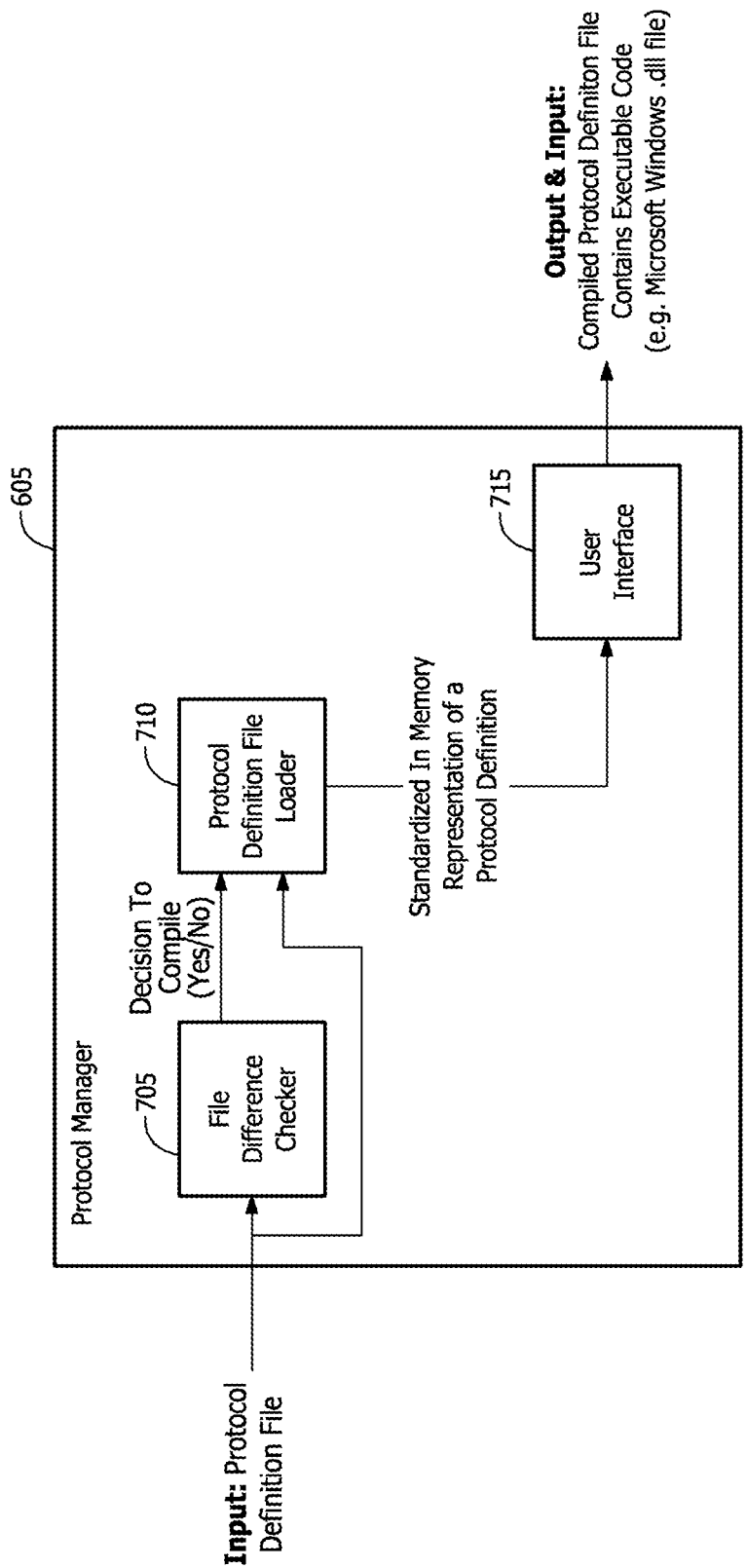

FIG. 7 is a block diagram illustrating an exemplary embodiment of protocol manager 605. In this exemplary embodiment, protocol manager 605 includes file difference checker 705, protocol definition file loader 710, and protocol compiler 715. In one embodiment, file difference checker 705 is responsible for determining if the compiled protocol definition files are out of date with the input protocol definition files. In this embodiment, file difference checker 705 checks the most recent file write time of the input protocol definition files and the compiled protocol definition files. If the most recent file write time of the input protocol definition files is more recent than the most recent file write time of the compiled protocol definition files, then the resulting decision to compile would be true. Additionally, if input protocol definition files exist, but no compiled protocol definition files exist, then the decision to compile would be true. If file difference checker 705 determines that the compiled protocol definition file is up to date, then there is no need to recreate it. By performing such check, file difference checker 705 can greatly improve the startup performance of the application by avoiding unnecessary re-compilation.

In one embodiment, protocol definition file loader 710 is responsible for reading the contents of the input protocol definition file. The information in the input protocol definition files is read into memory and converted to a single in-memory representation of a protocol definition. Protocol compiler 715 converts the standard in-memory representation of a protocol definition into executable form. In this embodiment, protocol compiler 715 is responsible for creating the output compiled protocol definition file. In this embodiment, because protocol definition file loader 710 converts the information in the input protocol definition files to a single in-memory representation of a protocol definition, the process of converting the standard in-memory representation of a protocol definition into executable form is simplified as the executable code created by protocol compiler 715 need only be written to read a single format.

Figure 8:
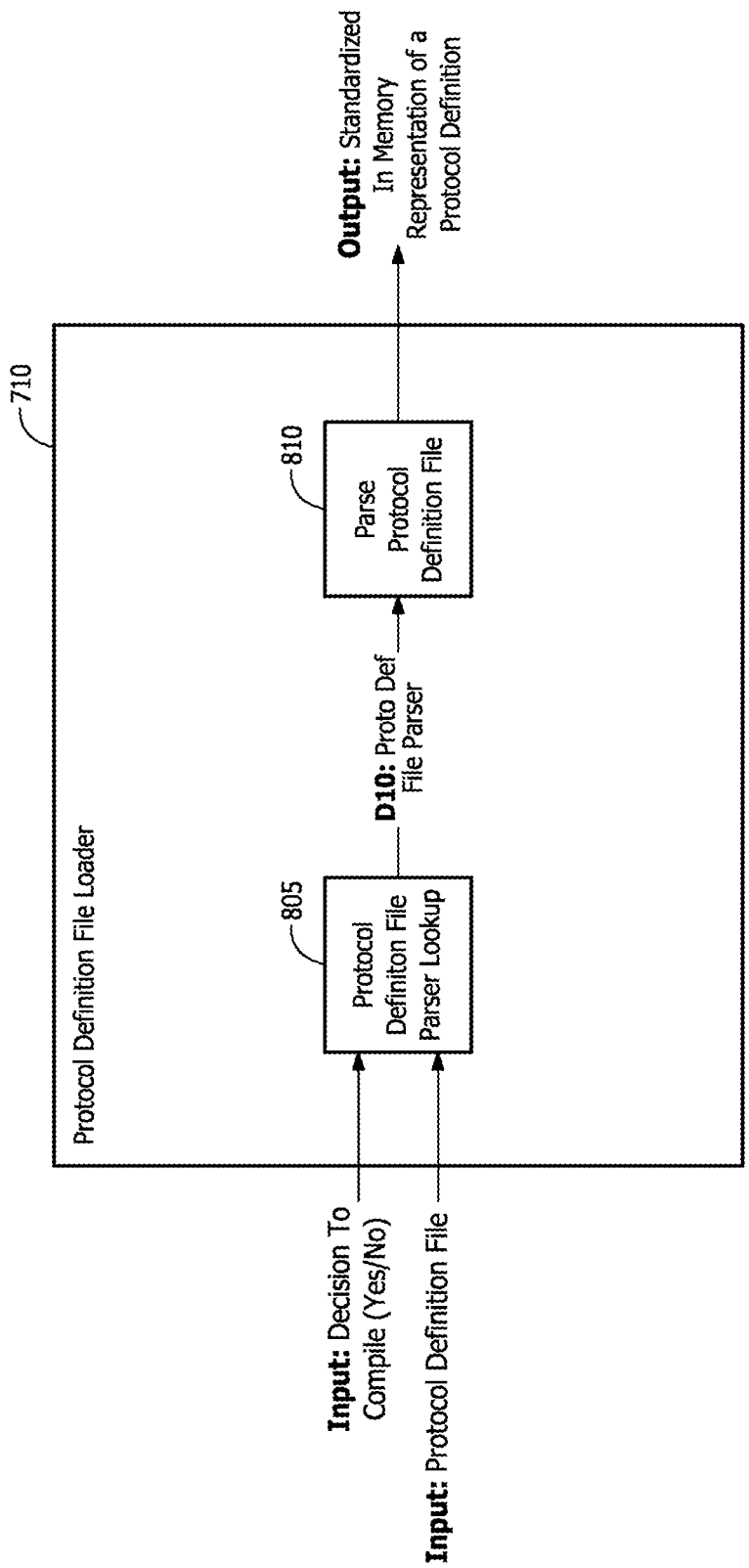

FIG. 8 is a block diagram illustrating an exemplary embodiment of protocol definition file loader 710. In the exemplary embodiment, protocol definition file loader 710 includes protocol definition file parse lookup 805 and parse protocol definition file 810. In this embodiment, in order to support multiple protocol definition file formats, different file parsers are used to process different protocol definition file formats. Protocol definition file parser lookup 805 is responsible for examining the input protocol definition file and determining which parser to use to read the contents of the input protocol definition file into memory. In one embodiment, protocol definition file parser lookup 805 examines the file extension of the input protocol definition file. In another exemplary embodiment, protocol definition file parser lookup 805 processes a database connection string and determines which database to connect to for purposes of extracting a protocol definition. Protocol definition file parser lookup 805 provides the protocol definition file parser that parse protocol definition file 810 uses to convert the data in the input protocol definition file into the standardized in-memory representation of a protocol definition. Parse protocol definition file 810 is responsible for using the parser that protocol definition file parser lookup 805 instantiated to convert the contents of the protocol definition file into the standard in-memory protocol definition.

Figure 9:
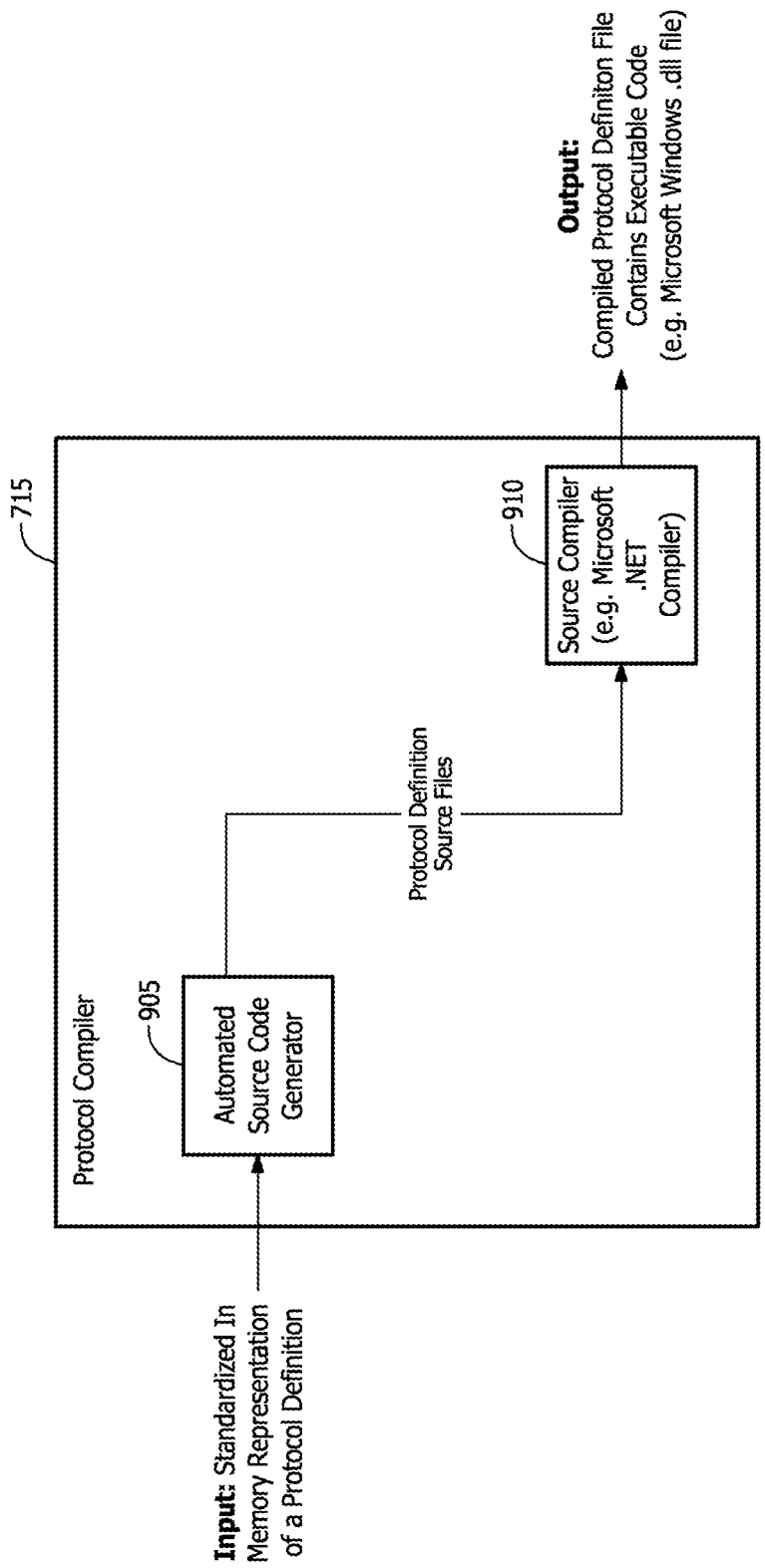

FIG. 9 is a block diagram illustrating an exemplary embodiment of protocol compiler 715. In the exemplary embodiment, protocol compiler 715 includes automated source code generator 905 and source code compiler 910. In this embodiment, automated source code generator 905 takes the standardized in-memory protocol definition and generates the source code that will be passed to source code compiler 910 to generate the compiled protocol definition file. In one embodiment, the generated source code includes code that defines how to represent protocol specific messages in memory and a parser that can convert raw network traffic into instantiations of the protocol specific messages. In another embodiment, source compiler 910 is responsible for converting the source code produced by automated source code generator 905 into executable code. In another exemplary embodiment, source code compiler 910 is provided by a 3rd party source code provider. For example, the Microsoft .NET platform includes a source code compiler with its runtime which allows an application to perform the compilation at the deployment site instead of requiring the vendor of network analysis tool 505 to rebuild the software.

Figure 10:
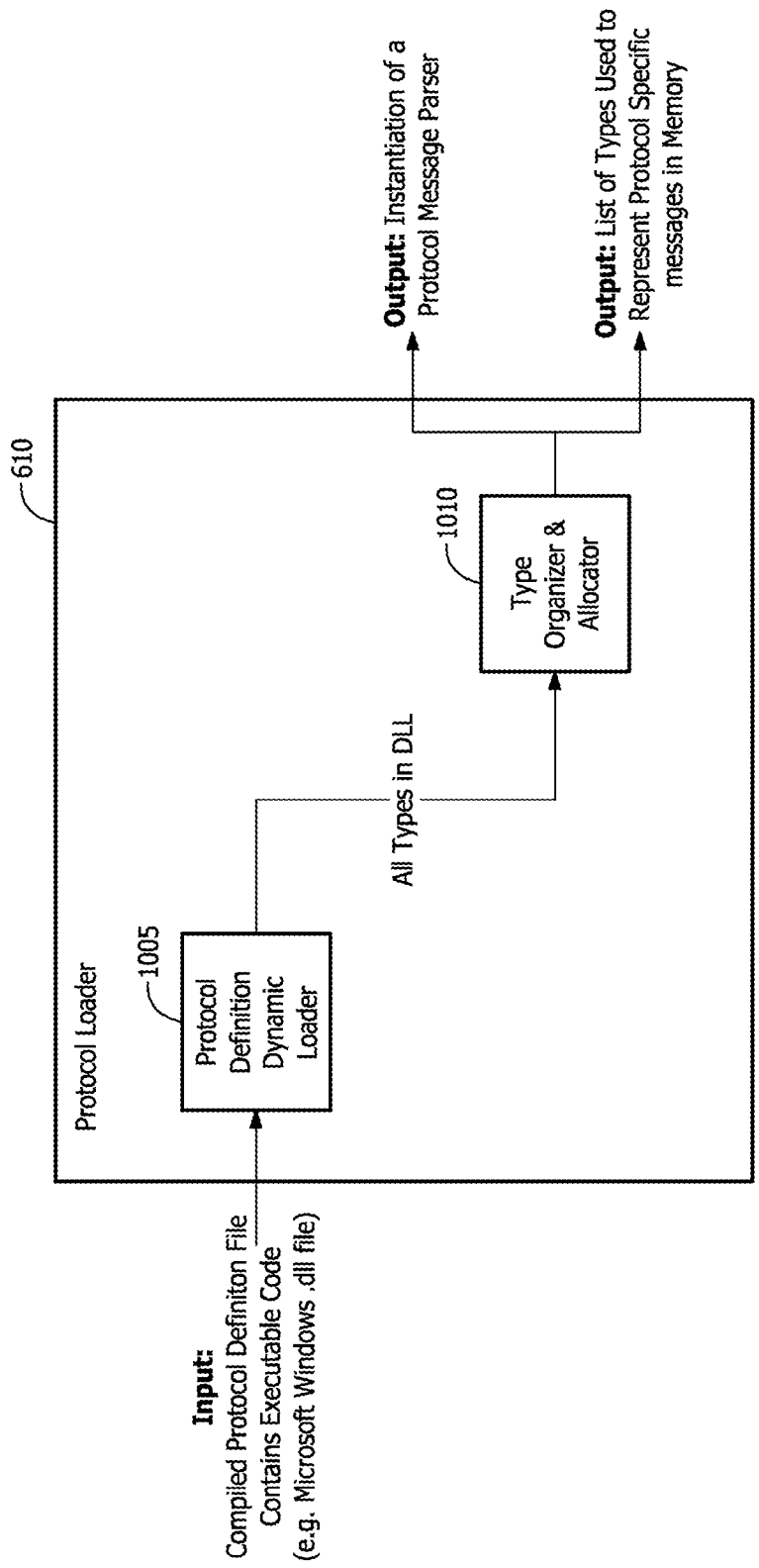

FIG. 10 is a block diagram illustrating an exemplary embodiment of protocol loader 610. In the exemplary embodiment, protocol loader 610 includes protocol definition dynamic loader 1005 and type organizer and allocator 1010. Protocol definition dynamic loader 1005 is responsible for loading a compiled protocol definition file into application memory. In one exemplary embodiment, protocol definition dynamic loader 1005 is supported by the operating system, such as the Assembly.LoadFrom method provided by the Microsoft .NET runtime. In this embodiment, type organizer and allocator 1010 provides the application with a means to instantiate protocol parsers and to look-up available protocol specific message types. In one embodiment, an application can query type organizer and allocator 1010 and retrieve a list of all of the types that are used to represent protocol specific data in memory. In another embodiment, type organizer and allocator 1010 can be queried to retrieve a parser for a given protocol. Thus, an application may request a parser for a protocol without knowing any specifics about the protocol other than which parser to request based on a protocol name, description, or unique identifier.

Figure 11:
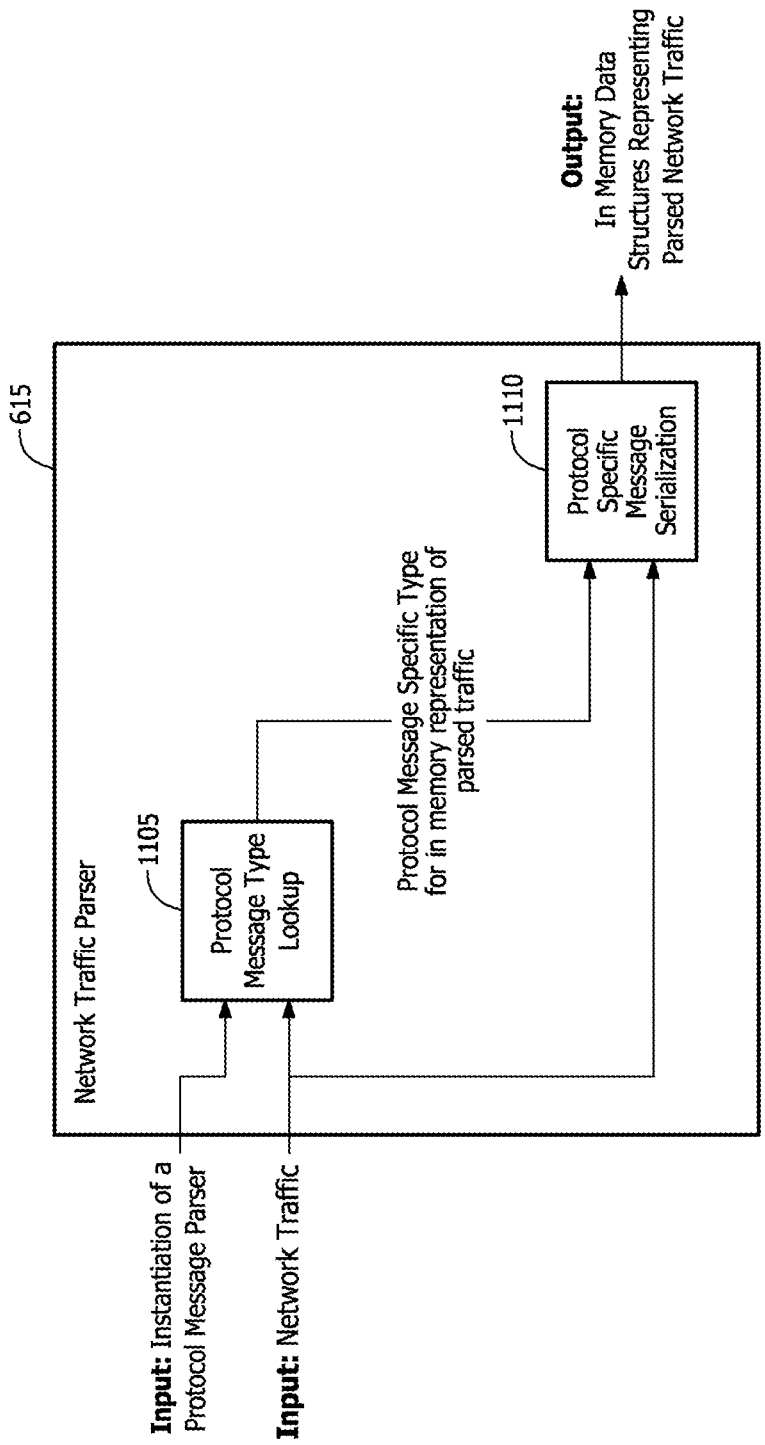

FIG. 11 is a block diagram illustrating an exemplary embodiment of network traffic parser 615. In the exemplary embodiment, network traffic parser 615 includes protocol message type lookup 1105 and protocol specific message serialization 1110. Protocol message type lookup 1105 is provided by the input protocol specific parser whose executable code is defined in the compiled protocol definition file (shown in FIG. 10). Protocol message type lookup 1105 is responsible for examining the contents of the raw network traffic and determining which protocol specific message type from the output list of types (shown in FIG. 10) to instantiate. In this embodiment, once a determination is made regarding the type of data contained in the raw network traffic, protocol message type lookup 1105 retrieves one or more protocol specific message types and instantiates the protocol specific message for population/initialization by protocol specific message serialization 1110. Protocol specific message serialization 1110 is responsible for breaking up the raw network traffic into fundamental constructs (i.e. integer, float, string, flags, and enumerations) and initializing the protocol specific message instantiated by protocol message type lookup 1105. This process of extracting the data from the raw data and converting it to an in-memory protocol specific memory representation may be referred to as serialization.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for applying an update to a communication protocol in a software application executed by a computing device, the method comprising:

storing a first machine-executable object parser configured to parse received data objects based on a communication protocol, wherein the first machine-executable object parser is associated with a first timestamp, and wherein the first machine-executable object parser is based on a first protocol definition, wherein the first protocol definition indicates positions of data elements within data objects corresponding to the communication protocol;

executing, by the computer device, the software application including the first machine-executable object parser, wherein the first machine-executable object parser is loaded in active memory of the computing device and is in communication with the software application;

receiving, by the computing device, a second protocol definition corresponding to the communication protocol, wherein the second protocol definition indicates positions of data elements within data objects corresponding to the communication protocol, and wherein the second protocol definition includes a second timestamp;

determining, by the computing device, that the second protocol definition differs from the first protocol definition;

determining that the second timestamp is newer than the first timestamp;

upon determining that the second timestamp is newer than the first timestamp, automatically creating, by the computing device and without pausing execution of the software application, a second machine-executable object parser based on the second protocol definition;

replacing the first machine-executable object parser in active memory with the second machine-executable object parser;

receiving, by the software application, a data object corresponding to the communication protocol; and executing, by the computing device, the second machine-executable object parser to parse at least a portion of the data elements in the data object received by the software application and communicating the parsed data elements to the software application.

2. The method in accordance with claim 1, wherein the second machine-executable object parser is created by the computing device without prompting a user of the computing device to approve the creation of the second machine-executable object parser.

3. The method in accordance with claim 1, wherein creating the second machine-executable object parser comprises generating source code based on the second protocol definition.

4. The method in accordance with claim 3, wherein creating the second machine-executable object parser further comprises compiling the generated source code.

5. The method in accordance with claim 1, wherein creating the second machine-executable object parser comprises:
   determining that the second protocol definition corresponds to a protocol definition format; and
   parsing the second protocol definition based on the protocol definition format.

6. The method in accordance with claim 1, wherein the second machine-executable object parser is not created when the second protocol definition and the first protocol definition do not differ.

7. The method in accordance with claim 1, the method further comprising:
   storing, by the computing device, the created second machine-executable object parser; and
   executing, by the computing device, the second machine-executable object parser to parse data elements in data objects received by the software application until a third protocol definition corresponding to the communication protocol and differing from the second protocol definition is received by the computing device.

8. A system for applying an update to a communication protocol in a software application, the system comprising:
   a memory for storing a first protocol definition corresponding to a communication protocol and a first machine-executable object parser configured to parse received data objects based on the communication protocol, wherein the first machine-executable object parser is associated with a first timestamp, and wherein the first machine-executable object parser is based on the first protocol definition, wherein the first protocol definition indicates positions of data elements within data objects corresponding to the communication protocol;
   a communications unit configured to receive a second protocol definition corresponding to the communication protocol, wherein the second protocol definition indicates positions of data elements within data objects corresponding to the communication protocol, and wherein the second protocol definition includes a second timestamp; and
   a processor unit coupled to the memory and the communication interface, the processor programmed to:
      execute the software application including the first machine-executable object parser, wherein the first machine-executable object parser is loaded in active memory of the system and is in communication with the software application;
      determine that the second protocol definition differs from the first protocol definition;
      determine that the second timestamp is newer than the first timestamp;
      upon determining that the second timestamp is newer than the first timestamp, automatically create a second machine-executable object parser based on the second protocol definition without pausing execution of the software application;
      replace the first machine-executable object parser in active memory with the second machine-executable object parser;
      receive by the software application a data object corresponding to the communication protocol; and
      execute the second machine-executable object parser to parse at least a portion of the data elements in the data object received by the software application and communicate the parsed data elements to the software application.

9. The system in accordance with claim 8, wherein the processor is programmed to create the second machine-executable object parser without prompting a user of the system to approve the creation of the second machine-executable object parser.

10. The system in accordance with claim 8, wherein the processor is programmed to create the second machine-executable object parser at least in part by:
   generating source code based on the second protocol definition; and
   compiling the generated source code.

11. The system in accordance with claim 8, wherein the processor is further programmed to:
   store in the memory the second machine-executable object parser; and
   execute the second machine-executable object parser to parse data elements in data objects received by the software application until a third protocol definition corresponding to the communication protocol and differing from the second protocol definition is received.

12. A memory-based storage device having embodied thereon computer-executable instructions that, when executed by a processor unit, cause the processor unit to:
   store a first machine-executable object parser configured to parse received data objects based on a communication protocol, wherein the first machine-executable object parser is associated with a first timestamp, and wherein the first machine-executable object parser is based on a first protocol definition;
   execute, by the processor unit, a software application including the first machine-executable object parser, wherein the first machine-executable object parser is loaded in active memory of the computing device and is in communication with the software application;
   receive, by the processor unit, a second protocol definition corresponding to the communication protocol, wherein the second protocol definition indicates positions of data elements within data objects corresponding to the communication protocol;
   determine, by the processor unit, that the second protocol definition differs from the first protocol definition;
   determine that the second timestamp that is newer than the first timestamp;
   upon determining that the second timestamp is newer than the first timestamp, automatically create, by the processor unit without pausing execution of the software application, a second machine-executable object parser based on the second protocol definition;
   replace the first machine-executable object parser in active memory with the second machine-executable object parser;
   receive, by the software application, a data object corresponding to the communication protocol; and
   execute, by the computing device, the second machine-executable object parser to parse at least a portion of the data elements in the data object received by the software application and communicate the parsed data elements to the software application.

13. The storage device in accordance with claim 12, wherein the computer-executable instructions cause the processor unit to create the second machine-executable object parser without prompting a user of the computing device to approve the creation of the second machine-executable object parser.

14. The storage device in accordance with claim 12, wherein the computer-executable instructions cause the processor unit to create the second machine-executable object parser at least in part by:
   generating source code based on the second protocol definition; and
   compiling the generated source code.

15. The storage device in accordance with claim 12, wherein the computer-executable instructions cause the processor unit to create the second machine-executable object parser at least in part by:
   determining that the second protocol definition corresponds to a protocol definition format; and
   parsing the second protocol definition based on the protocol definition format.

16. The storage device in accordance with claim 15, wherein the computer-executable instructions further cause the processor unit to:
   store the second machine-executable object parser; and
   execute the second machine-executable object parser to parse data elements in data objects received by the software application until a third protocol definition corresponding to the communication protocol and differing from the second protocol definition is received.

17. The method in accordance with claim 1, wherein the data object is encoded in binary form, and wherein the method further comprises determining the type of data contained in the binary data based on values in particular byte positions.

18. The method in accordance with claim 1, wherein automatically creating the second machine-executable object parser based on the second protocol definition comprises creating human-readable source code based on the second protocol definition.

19. The method in accordance with claim 1, wherein automatically creating the second machine-executable object parser based on the received protocol definition comprises converting the definition directly to an intermediate language.

20. The method in accordance with claim 19, further comprising selecting intermediate language instructions based on an efficiency of the language instructions.

* * * * *